(12) United States Patent
Nakajo

(10) Patent No.: US 6,719,457 B2
(45) Date of Patent: Apr. 13, 2004

(54) RADIATION CASSETTE AND METHOD OF MANUFACTURING SAME

(75) Inventor: Masakazu Nakajo, Minamiashigara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 384 days.

(21) Appl. No.: 09/866,675

(22) Filed: May 30, 2001

(65) Prior Publication Data

US 2001/0050975 A1 Dec. 13, 2001

(30) Foreign Application Priority Data

May 30, 2000 (JP) ........................................ 2000-160638
Jun. 6, 2000 (JP) ........................................ 2000-169508

(51) Int. Cl.$^7$ ............................................. G03B 42/04
(52) U.S. Cl. ...................................... 378/188; 378/182
(58) Field of Search ................................. 378/169, 172, 378/182, 188; 250/483.1, 484.4, 485.1

(56) References Cited

U.S. PATENT DOCUMENTS

| 4,841,558 A | * | 6/1989 | Kaneko et al. | 378/182 |
| 4,889,233 A | * | 12/1989 | Torii | 206/455 |
| 5,101,423 A | * | 3/1992 | Okamoto et al. | 378/182 |
| 5,475,230 A | * | 12/1995 | Stumpf et al. | 250/484.4 |
| 5,861,631 A | * | 1/1999 | Wendlandt et al. | 250/484.4 |
| 5,912,944 A | * | 6/1999 | Budinski et al. | 378/182 |

* cited by examiner

Primary Examiner—Craig E Church
Assistant Examiner—Jurie Yun
(74) Attorney, Agent, or Firm—Sughrue Mion, PLLC

(57) ABSTRACT

A casing has a flat plate for being irradiated with a radiation from an external source, a plurality of metal plates disposed on edges of inner surfaces of ends of the flat plate, and a plurality of resin frames integrally molded on the ends of the flat plate in embedding relation to the metal plates. It is possible to produce a high-quality radiation cassette having a simple structure which prevents the resin frames integrally molded on the flat plate from being deformed, according to a simple process.

15 Claims, 8 Drawing Sheets

RADIATION CASSETTE AND METHOD OF MANUFACTURING SAME

BACKGROUND OF THE INVENTION

1. Field of the Invention

The present invention relates to a radiation cassette including a casing for storing a radiation image recording medium, and a light shielding plate for holding the radiation image recording medium in a light-shielded condition, the light shielding plate having a lid openably and closably mounted on at least a portion of the casing, and a method of manufacturing such a radiation cassette.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display device such as a CRT or the like.

The stimulable phosphor is a phosphor which, when exposed to an applied radiation (X-rays, $\alpha$-rays, $\gamma$-rays, electron beams, ultraviolet radiation, or the like), stores a part of the energy of the radiation, and, when subsequently exposed to applied stimulating rays such as visible light, emits light in proportion to the stored energy of the radiation. Usually, a sheet provided with a layer of the stimulable phosphor is used as a stimulable phosphor sheet.

It has been practiced to apply a radiation, e.g., X-rays, to a subject such as a human body or the like to record the radiation image information of the subject directly on a photographic film. When the photographic film is developed, the recorded radiation image information is turned into a visible image, which will be used for medical diagnosis or the like.

Radiation image recording mediums such as stimulable phosphor sheets, photographic films, or the like are usually stored in respective cassettes. When a cassette with a radiation image recording medium stored therein is loaded into an exposure apparatus, X-rays representing radiation image information are applied to the radiation image recording medium through the cassette.

If a face plate of the cassette which is to be irradiated with X-rays were integrally molded, then the face plate would tend to entrap foreign matter, have reduced mechanical strength, and suffer a reduction in the X-ray transmittance. One known cassette that has been proposed to eliminate the above shortcomings comprises a flat plate made of a carbon sheet, an aluminum sheet, or the like and four side frame members made of a plastics or the like according to an insert molding process.

However, when the frame members are molded of a resin such as plastics, they are liable to suffer molding shrinkage. Therefore, the four sides of the cassette are unduly warped or deformed. Large-side cassettes thus manufactured are likely to have a considerably large amount of warpage or deformation thus introduced and hence to become defective. One solution would be to mold cassettes of a resin which is less liable to cause warpage, e.g., a resin containing glass fibers or the like. However, such a resin is of poor appearance.

When a cassette storing a stimulable phosphor sheet is loaded into a radiation image reading apparatus, the stimulable phosphor sheet is removed from the cassette and repeatedly fed in the radiation image reading apparatus. Therefore, the stimulable phosphor sheet tends to be electrically charged. If the cassette has a face plate made of a carbon sheet, then since the carbon sheet is an electrically conductive material, the electric charge is transferred from the stimulable phosphor sheet via the cassette to human hands or other objects when the cassette storing the stimulable phosphor sheet is removed from the radiation image reading apparatus.

SUMMARY OF THE INVENTION

It is a general object of the present invention to provide a radiation cassette which is of a simple structure, can be manufactured according to a simple process, is free of deformations, and has high quality, and a method of manufacturing such a radiation cassette.

A major object of the present invention to provide a radiation cassette which is of a simple structure to reliably prevent an electric discharge from occurring from a radiation image recording medium via the radiation cassette to an external object.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
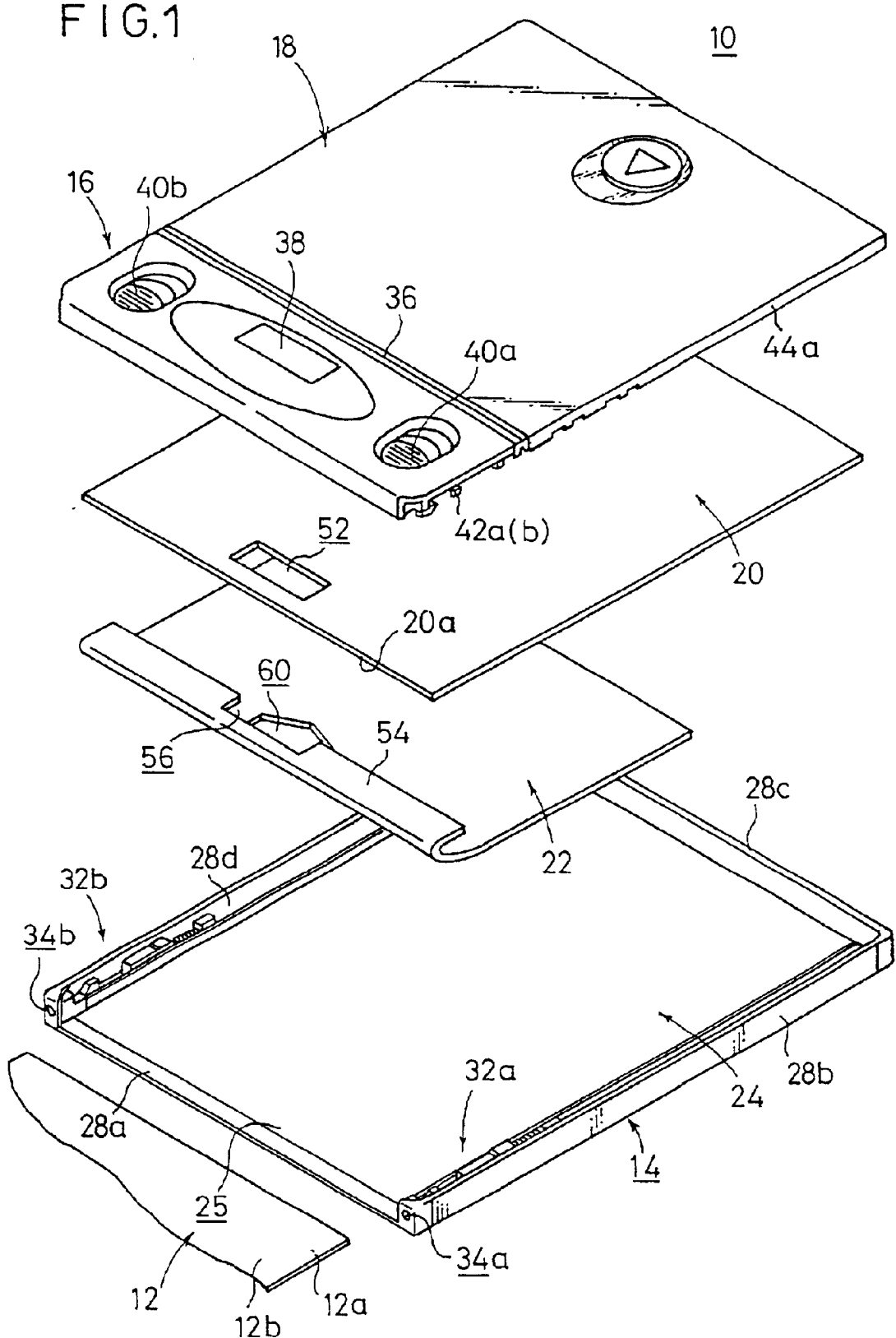
FIG. 1 is an exploded perspective view of a radiation cassette according to the present invention.
Figure 2:
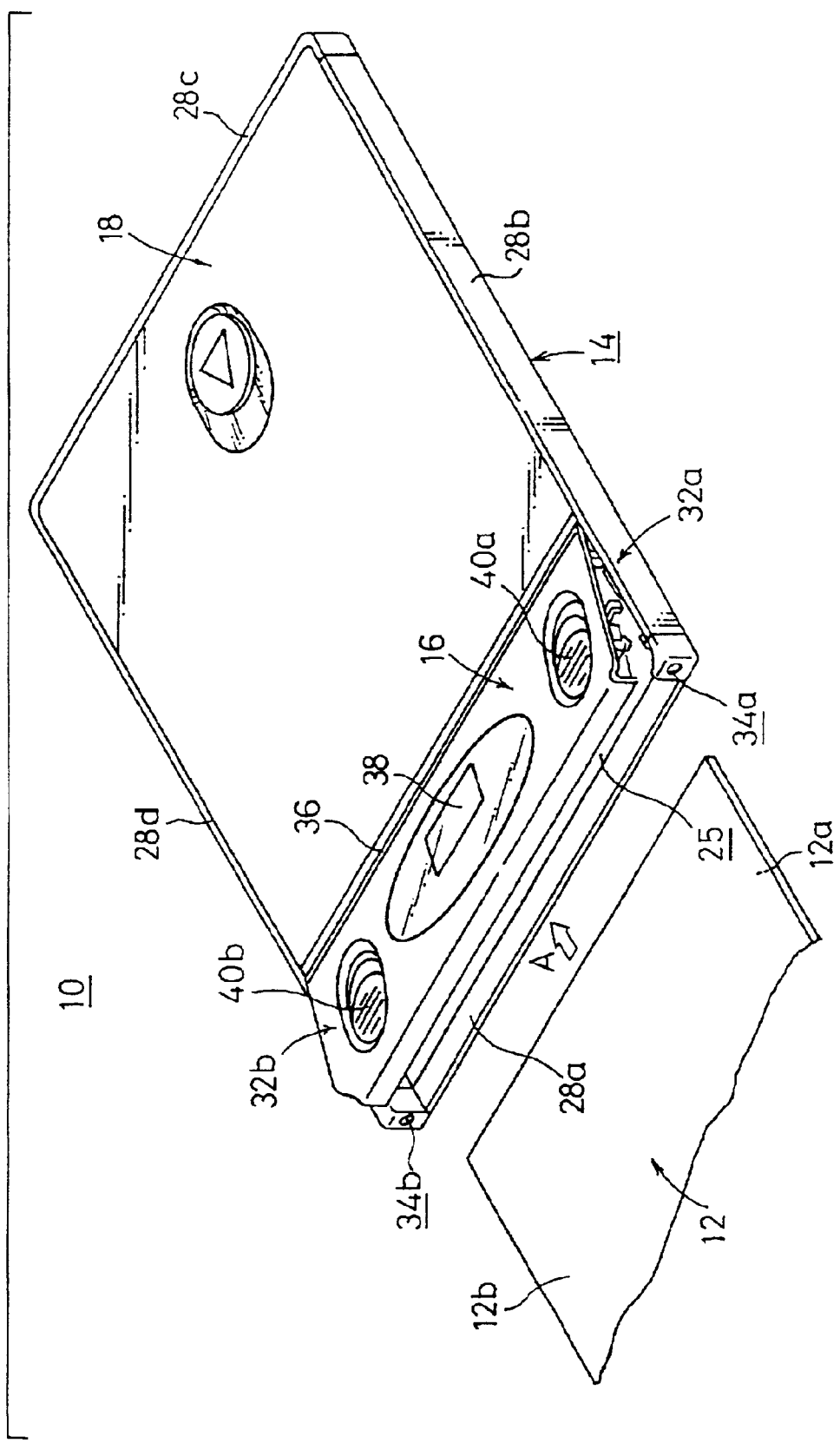
FIG. 2 is a perspective view of the radiation cassette.

FIG. 1 shows in exploded perspective a radiation cassette 10 according to the present invention, and FIG. 2 shows in perspective the radiation cassette 10 which is assembled.

As shown in FIGS. 1 and 2, the radiation cassette 10 comprises a casing 14 for storing a stimulable phosphor sheet (radiation image recording medium) 12 therein, a light shielding plate 18 for holding the stimulable phosphor sheet 12 in a light-shielded condition, the light shielding plate 18 having a lid 16 openably and closably mounted on at least a portion of the casing 14, a lead sheet 20 disposed in the casing 14 in covering relation to a reverse side 12b of the stimulable phosphor sheet 12 which is opposite to a radiation-irradiated surface 12a thereof, the lead sheet 20 having a free end 20a extending underneath the lid 16, and a guide sheet 22 (see also FIG. 3) disposed in the casing 14 and having an end fixed to the reverse side of the lid 16 and an opposite end interposed between the lead sheet 20 and the stimulable phosphor sheet 12.

Figure 4:
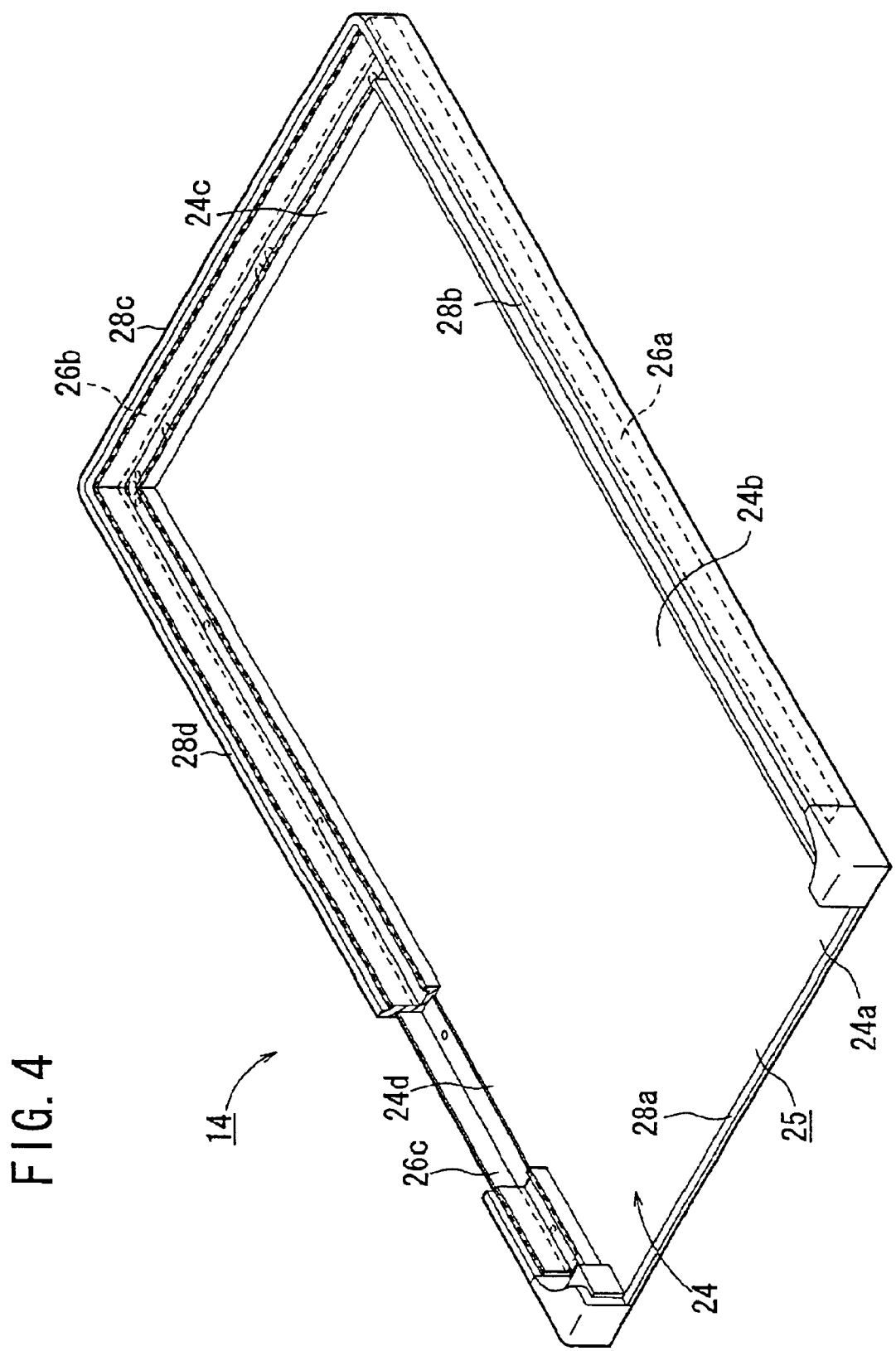
FIG. 4 is a perspective view, partly cut away, of a casing of the radiation cassette.

As shown in FIGS. 1 and 4, the casing 14 comprises a flat plate 24 which is irradiated with a radiation from an external source, the flat plate 24 having four ends 24a, 24b, 24c, 24d, three metal plates 26a, 26b, 26c disposed on the edges of inner surfaces of the three ends 24b, 24c, 24d except the end 24a which provides an opening 25 for removing the stimulable phosphor sheet 12, and resin frames 28a, 28b, 28c, 28d integrally molded on the ends 24a, 24b, 24c, 24d of the flat plate 24 in embedding relation to the metal plates 26a, 26b, 26c.

Figure 5:
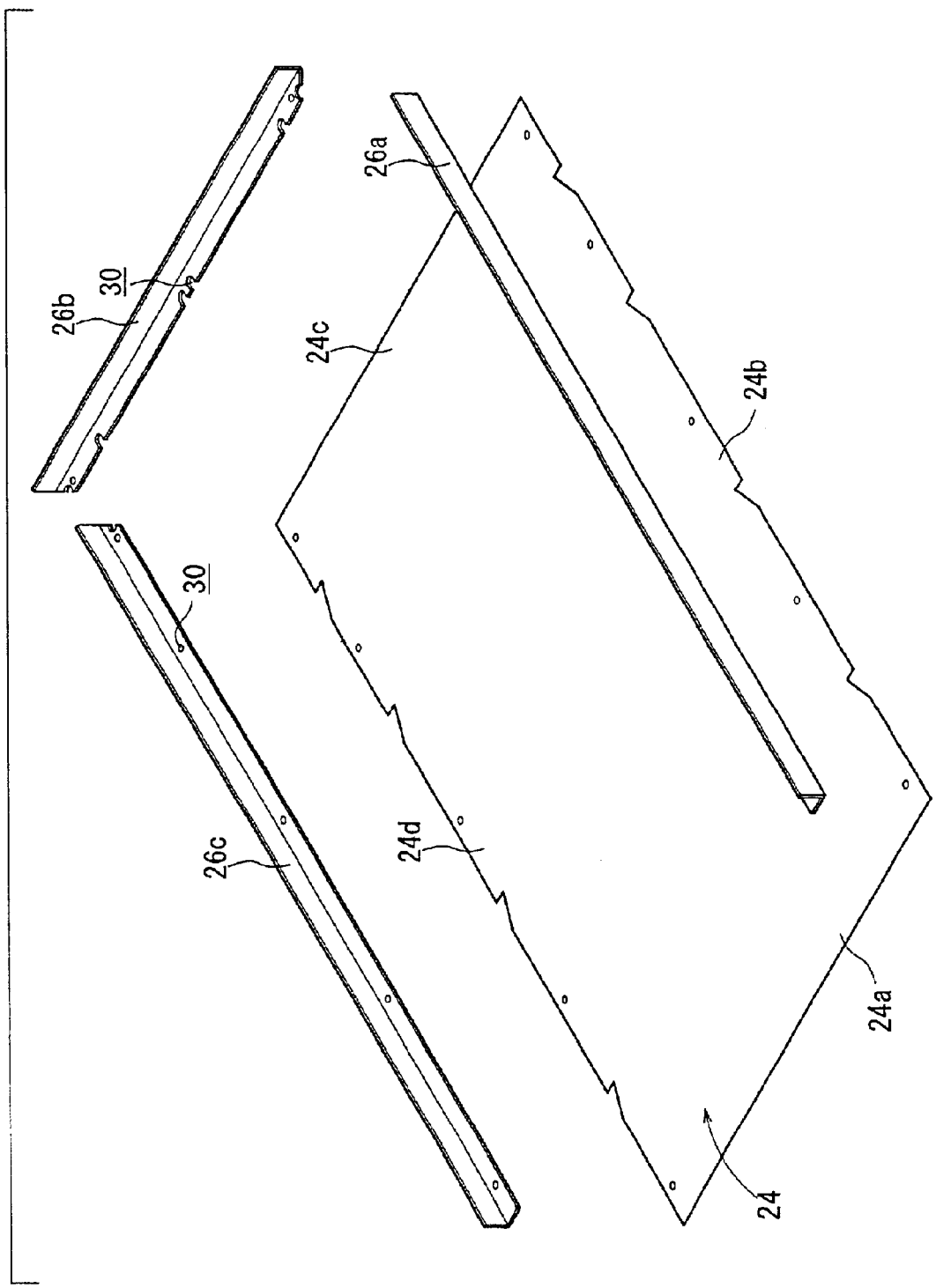
FIG. 5 is an exploded perspective view of a flat plate and metal plates of the casing.

As shown in FIGS. 4 and 5, each of the metal plates 26a, 26b, 26c comprises a cross-sectionally L-shaped metal plate of SUS, aluminum, or the like. The metal plates 26a, 26b, 26c are temporarily attached to the inner surface of the flat plate 24 by double-sided adhesive tapes or the like. The metal plates 26a, 26b, 26c have respective bottom panels placed on the flat plate 24 and having openings 30 such as holes, recesses, or the like.

The metal plates 26a, 26c are of a longer shape extending along the longitudinal ends 24b, 24d of the flat plate 24, and the metal plate 26b is of a shorter shape extending along the transverse end 24c of the flat plate 24. The metal plate 26b has opposite ends which can abut against and support corresponding ends of the metal plates 26a, 26c.

Figure 6:
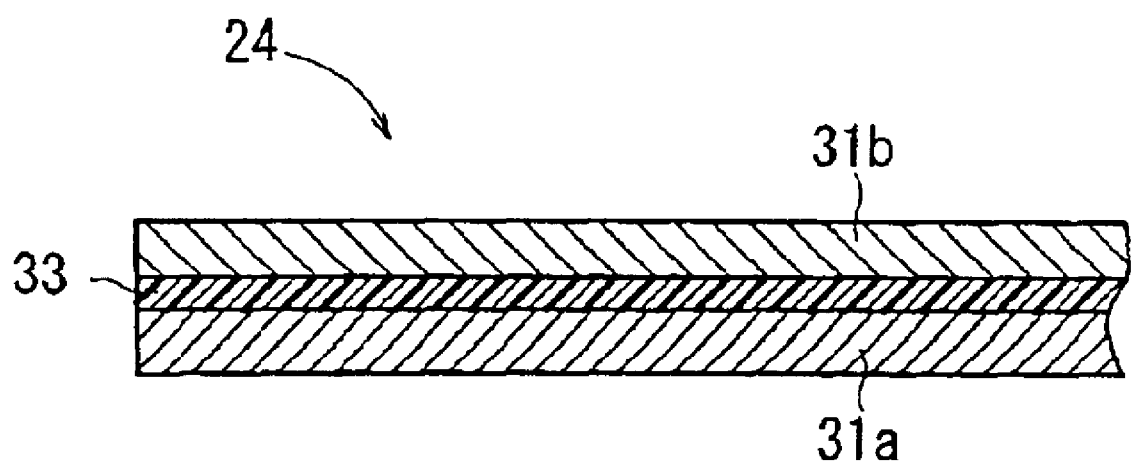
FIG. 6 is an enlarged fragmentary cross-sectional view of the flat plate of the casing.

As shown in FIG. 6, the flat plate 24 is of a three-layer structure including an outer carbon plate 31a providing one surface, an inner carbon plate 31b providing another surface, and an insulating sheet (insulating layer) 33 interposed between the outer and inner carbon plates 31a, 31b. The outer carbon plate 31a provides a surface to be irradiated with a radiation, and the inner carbon plate 31b provides a surface within the casing 14 which is to be held in sliding contact with the stimulable phosphor sheet 12.

The insulating sheet 33 is made of a material having an insulating strength of 5 kV or more as inspected by an electrostatic testing machine, e.g., a resin material such as polypropylene (PP), polyethylene terephthalate (PET), or the like. The insulating sheet 33 has such a thickness which does not affect its X-ray transmittance, specifically, a thickness not more than 0.3 mm.

As shown in FIGS. 1 and 2, the frames 28b, 28d incorporate therein respective lock means 32a, 32b for locking the lid 16 in respective end portions thereof closer to the frame 28a. The frames 28b, 28d have respective holes 34a, 34b defined in respective tip ends thereof for inserting unlock pins for releasing the lock means 32a, 32b.

The light shielding plate 18 closes an upper area of the casing 14, and is detachably mounted on the casing 14 by a stopper pin (not shown). The lid 16 is integrally joined to the light shielding plate 18 by a hinge 36, and is openably and closably mounted on the casing 14. The lid 16 has a bar-code readout window 38 defined therein. Unlock knobs 40a, 40b which can manually be operated by the operator to release the lock means 32a, 32b are movably mounted on the lid 16. The lid 16 has lock fingers 42a, 42b disposed on its reverse side for engaging the lock means 32a, 32b, respectively.

Figure 3:
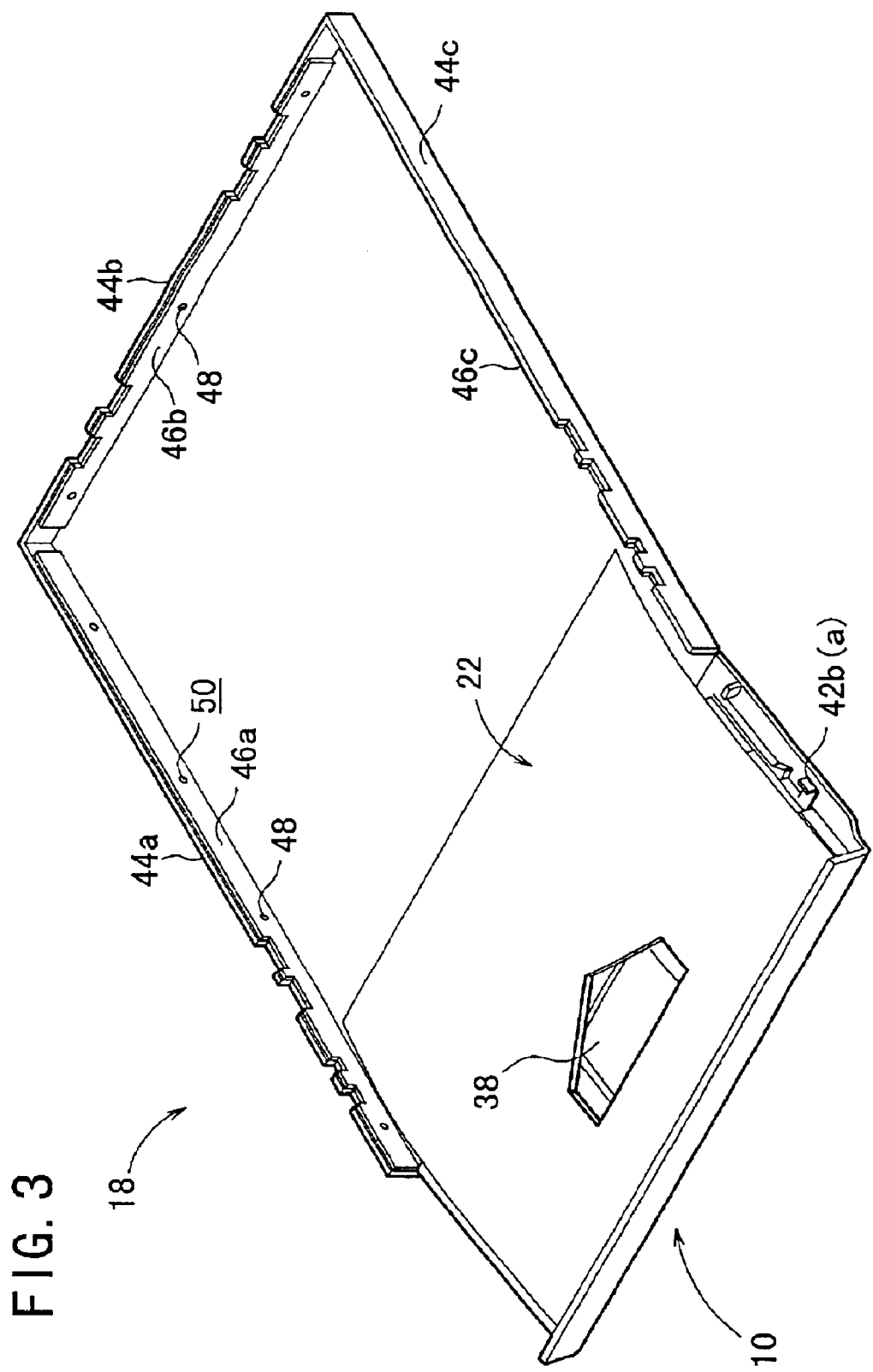
FIG. 3 is a perspective view of a light shield shielding plate of the radiation cassette.

As shown in FIGS. 1 and 3, the light shielding plate 18 has bent edges 44a, 44b, 44c on its three ends which project toward the casing 14, and reinforcing metal plates (metal members) 46a, 46b, 46c are attached to respective inner surfaces of the bent edges 44a, 44b, 44c. The reinforcing metal plates 46a, 46b, 46c are supported on the bent edges 44a, 44b, 44c by a plurality of projections 48 disposed on the inner surfaces of the bent edges 44a, 44b, 44c and inserted in respective holes 50 that are defined in the reinforcing metal plates 46a, 46b, 46c. The reinforcing metal plates 46a, 46b, 46c are made of a high-strength material such as spring steel of SUS to sufficiently bear given loads.

As shown in FIG. 1, the lead sheet 20 has an opening 52 defined therein near its free end 20a in registration with the window 38 in the lid 16. The guide sheet 22 comprises a resin sheet, e.g., PP (polypropylene) sheet, and has a recess 56 defined in an end 54 thereof that is fixed to the reverse side of the lid 16, the recess 56 being positioned in registration with the window 38. The guide sheet 22 has an opening 60 defined in a portion thereof folded from the end 54 over the casing 14 in registration with the window 38.

A method of manufacturing the radiation cassette 10 will be described in detail below.

Figure 7:
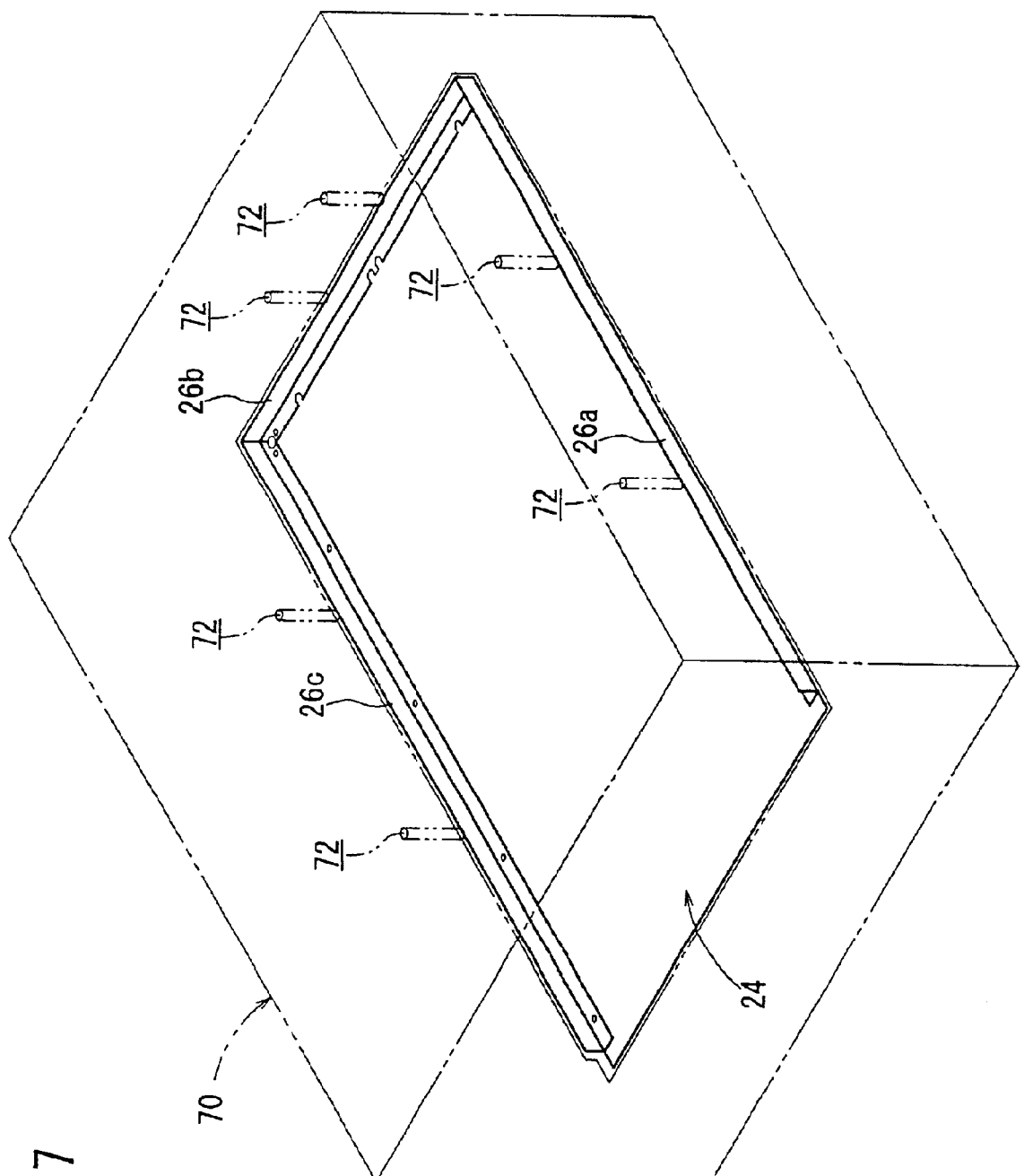
FIG. 7 is a perspective view showing the flat plate and the metal plates attached thereto which are placed in an injection molding machine.

As shown in FIG. 5, the flat plate 24 is prepared, and the cross-sectionally L-shaped metal plates 26a, 26b, 26c are temporarily attached to the respective three ends 24b, 24c, 24d of the flat plate 24 by a suitable bonding means such as double-sided adhesive tapes or the like. Then, as shown in FIG. 7, the flat plate 24 with the metal plates 26a, 26b, 26c temporarily attached thereto is placed in a mold cavity (not shown) in an injection-molding machine 70. A molten resin is then introduced to fill the mold cavity from a plurality of gates 72 in the injection-molding machine 70.

The frames 28a, 28b, 28c, 28d are now integrally molded of the molten resin around the respective ends 24a, 24b, 24c, 24d of the flat plate 24, with the metal plates 26a, 26b, 26c embedded in the respective frames 28b, 28c, 28d (see FIG. 4). Thus, the flat plate 24 and the resin-molded frames 28a, 28b, 28c, 28d are integrally joined to each other, producing the casing 14.

As described above, when the frames 28a, 28b, 28c, 28d are integrally injection-molded on the ends 24a, 24b, 24c, 24d of the flat plate 24, the metal plates 26a, 26b, 26c of SUS or aluminum that have been placed on those ends 24a, 24b, 24c, 24d are embedded in the respective frames 28a, 28b, 28c, 28d. Therefore, even if the frames 28a, 28b, 28c, 28d suffer molding shrinkage, the casing 14 is effectively prevented from being warped or otherwise deformed because it is reinforced by the metal plates 26a, 26b, 26c.

Consequently, the casing 14 is protected from adverse effects of molding shrinkage caused when the frames 28a, 28b, 28c, 28d are integrally molded, by a simple process of placing the cross-sectionally L-shaped metal plates 26a, 26b, 26c on the flat plate 24 and a simple structure of the cross-sectionally L-shaped metal plates 26a, 26b, 26c disposed on the flat plate 24. Thus, the casing 14 which is of high quality and is free of deformations such as warpages can efficiently be manufactured.

Figure 8:
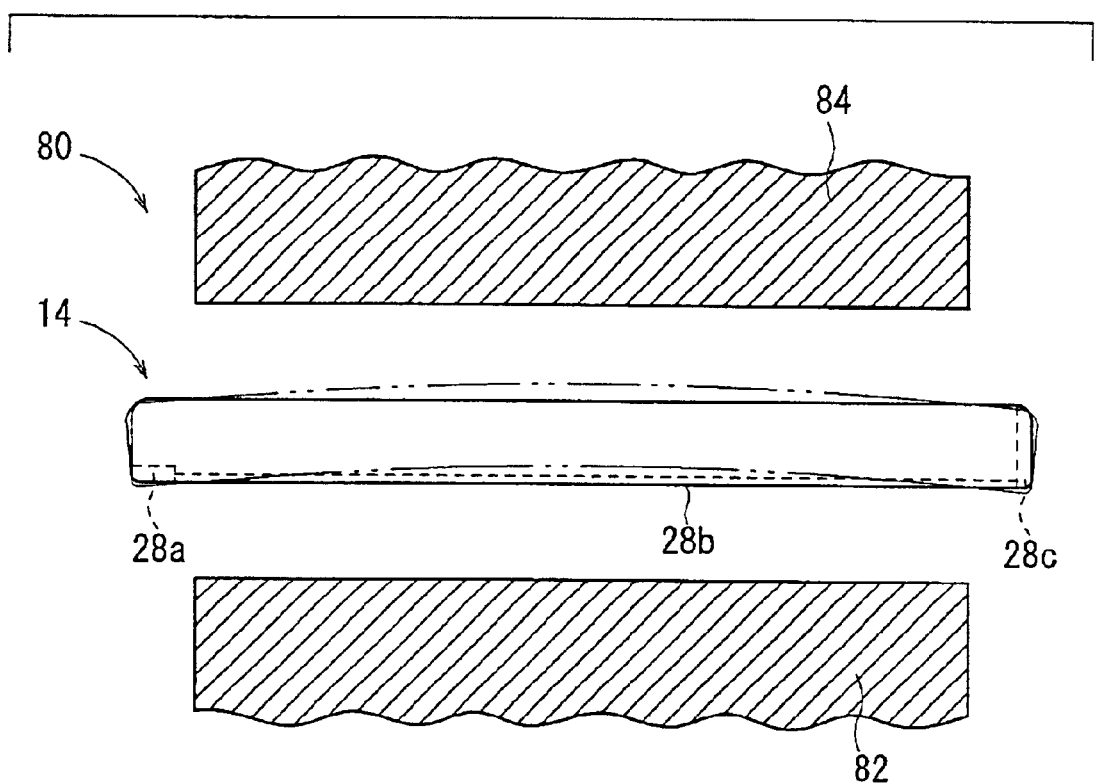
FIG. 8 is a sectional elevational view showing the manner in which the casing is pressed.

If the casing 14 is of large dimensions and happens to be deformed by the molding shrinkage of the frames 28a, 28b, 28c, 28d, then the deformed region, e.g., the frame 28b where the metal plate 26a is embedded, may be pressed. Specifically, as shown in FIG. 8, the frame 28b is placed between a lower die 82 and an upper die 84 of a press 80, and then the lower die 82 and the upper die 84 are brought together to press the metal plate 26b. The frame 28b is corrected from a warped shape indicated by the two-dot-and-dash lines into a flat shape indicated by the solid lines, thus making the casing 14 flat as a whole.

Then, the casing 14 thus manufactured is machined in various ways, and other components are assembled on the casing 14. For example, the lock means 32a, 32b are mounted in the frames 28b, 28d, and the holes 34a, 34b are defined in the frames 28b, 28d.

Operation of the radiation cassette 10 thus constructed will be described below.

For inserting the stimulable phosphor sheet 12 having yet to record radiation image information thereon into the radiation cassette 10, the operator directly operates the knobs 40a, 40b on the lid 16, or inserts the unlock pins into the holes 34a, 34b in the casing 14 in a loading device (not shown) to release the lock means 32a, 32b.

When the lid 16 is opened, i.e., angularly moved away from the casing 14 about the hinge 36, the opening 25 in the casing 14 is opened, and the stimulable phosphor sheet 12 is inserted into the casing 14 through the opening 25. Then, the lid 16 is pressed toward the casing 14 until the lock fingers 42a, 42b on the reverse side of the lid 16 engage the respective lock means 32a, 32b, thus locking the lid 16 to the casing 14.

The radiation cassette 10 with the stimulable phosphor sheet 12 stored therein is loaded into an image recording apparatus (not shown). In the image recording apparatus, a radiation representing radiation image information of a subject, e.g., a patient to be diagnosed, is applied to the stimulable phosphor sheet 12 through the flat plate 24 of the radiation cassette 10, recording the radiation image information in the stimulable phosphor sheet 12.

In a portable exposure mode, the weight of the subject is applied to the radiation cassette 10 itself. According to the present invention, as shown in FIG. 3, the metal plates 46a, 46b, 46c made of a high strength material such as spring steel of SUS, for example, are attached to the inner surfaces of the bent edges 44a, 44b, 44c of the light shielding plate 18. Therefore, even when the weight of the subject is exerted directly on the radiation cassette 10, the metal plates 46a, 46b, 46c reinforce the bent edges 44a, 44b, 44c to prevent the radiation cassette 10 from being deformed.

Since only the metal plates 46a, 46b, 46c need to be mounted in the radiation cassette 10, they are not expensive and are not liable to be easily scratched unlike a conventional structure for preventing deformation such as an extrusion of aluminum. The metal plates 46a, 46b, 46c also do not increase the cost for equipment and do not cause inner members to be damaged due to deformations unlike an elastically deformable structure integrally molded of plastics.

In a radiation image reading apparatus, the stimulable phosphor sheet 12 tends to be electrically charged because it is repeatedly fed therein. When the radiation cassette 10 with the stimulable phosphor sheet 12 stored therein is handled, the electric charge is liable to be transferred from the stimulable phosphor sheet 12 via the flat plate 12 to human hands or an external facility.

According to the present invention, as shown in FIG. 6, the flat plate 24 is of a three-layer structure including the outer carbon plate 31a, the inner carbon plate 31b, and the insulating sheet 33 interposed between the outer and inner carbon plates 31a, 31b. The insulating sheet 33 is made of a material having an insulating strength of 5 kV or more.

Measurements obtained by an electrostatic testing machine indicate that the insulating strength of only a carbon plate is less than 4.5 kV, whereas the insulating strength of the insulating sheet 33 is of 5 kV or more. Therefore, when the hand or fingers of the operator touch the outer carbon plate 31a of the flat plate 24 while the stimulable phosphor sheet 12 stored in the radiation cassette 10 is being electrically charged, the insulating sheet 33 is effective to prevent the electric charge from being transferred to the hand or fingers of the operator.

The three-layer structure of the flat plate 24, which includes the outer carbon plate 31a, the inner carbon plate 31b, and the insulating sheet 33 interposed between the outer and inner carbon plates 31a, 31b, does not make the radiation cassette 10 unduly complex in structure, and hence makes the radiation cassette 10 simple and economical. Since the insulating sheet 33 is sandwiched between the outer carbon plate 31a and the inner carbon plate 31b, the insulating sheet 33 does not provide a surface of the flat plate 24. Consequently, the flat plate 24 is effectively prevented from being unsightly in appearance.

The insulating sheet 33 has a thickness not more than 0.3 mm. Therefore, when a radiation (X-rays) is applied to the flat plate 24 from the outer carbon plate 31a, the insulating sheet 33 does not adversely affect the radiation transmittance of the flat plate 24, allowing the desired radiation image of the subject to be recorded highly accurately in the stimulable phosphor sheet 12.

In the illustrated embodiment, the stimulable phosphor sheet 12 has been described as a radiation image recording medium However, a photographic film for directly recording radiation image information of a subject thereon by applying X-rays thereto may also be used as a radiation image recording medium.

With the radiation cassette and the method of manufacturing the radiation cassette according to the present invention, the rein frames are provided in embedding relation to the metal plates disposed on the flat plate. The metal plates are reliably effective in preventing the casing of the radiation cassette from being unduly deformed due to molding shrinkage of the resin frames. Thus, it is possible to efficiently manufacture the high-quality radiation cassette which is flat as a whole.

With the radiation cassette according to the present invention, the flat plate of the casing is of a three-layer structure including the carbon layers providing opposite surfaces and the insulating layer interposed between the carbon layers, and the insulating layer has an insulating strength of 5 kV or more. Consequently, even when the radiation image recording medium is electrically charged, the electric charge is prevented from being transferred to an external object via the flat plate. The radiation cassette is simple in structure and economical to manufacture because the flat plate may simply be of a three-layer structure.

Although a certain preferred embodiment of the present invention has been shown and described in detail, it should be understood that various changes and modifications may be made therein without departing from the scope of the appended claims.

What is claimed is:

1. A radiation cassette comprising:
   a casing for storing a radiation image recording medium therein; and
   a light shielding plate for holding the radiation image recording medium in a light-shielded condition, said light shielding plate having a lid openably and closably mounted on at least a portion of said casing;
   said casing comprising:
   a flat plate for being irradiated with a radiation from an external source;
   a plurality of metal plates disposed on edges of inner surfaces of ends of said flat plate; and
   a plurality of resin frames integrally molded on the ends of said flat plate in embedding relation to said metal plates.

2. A radiation cassette according to claim 1, wherein each of said metal plates is of an L-shaped cross section.

3. A radiation cassette according to claim 2, wherein each of said metal plates has a plurality of openings defined in a bottom panel thereof which is mounted on said flat plate.

4. A radiation cassette according to claim 1, wherein said flat plate has four ends, said resin frames being integrally molded in embedding relation to said metal plates on the three ends except the end which provides an opening for removing the radiation image recording medium.

5. A radiation cassette according to claim 1, wherein said light shielding plate has bent edges on ends thereof which project toward said casing, and reinforcing metal members attached to respective inner surfaces of said bend edges.

6. A radiation cassette according to claim 5, wherein said bent edges have a plurality of projections on inner surfaces thereof, and said reinforcing metal members have a plurality of holes, said projections being inserted respectively in said holes.

7. A radiation cassette according to claim 1, wherein said flat plate is of a three-layer structure including two carbon layers providing opposite surfaces and an insulating layer interposed between said carbon layers, said insulating layer having an insulating strength of at least 5 kV.

8. A radiation cassette according to claim 7, wherein said insulating layer has a thickness not more than 0.3 mm.

9. A radiation cassette comprising:

a casing for storing a radiation image recording medium therein; and a light shielding plate for holding the radiation image recording medium in a light-shielded condition, said light shielding plate having a lid openably and closably mounted on at least a portion of said casing;

said casing comprising:
a flat plate for being irradiated with a radiation from an external source;
said flat plate being only a three-layer structure including two carbon layers providing opposite surfaces and an insulating layer interposed between said carbon layers, said insulating layer having an insulating strength of at least 5 kV.

10. A radiation cassette according to claim 9, wherein said insulating layer has a thickness not more than 0.3 mm.

11. A method of manufacturing a radiation cassette including a casing for storing a radiation image recording medium therein, and a light shielding plate for holding the radiation image recording medium in a light-shielded condition, said light shielding plate having a lid openably and closably mounted on at least a portion of said casing, said method comprising the steps of:

placing metal plates on edges of inner surfaces of ends of a flat plate for being irradiated with a radiation from an external source;

integrally molding a plurality of resin frames on the ends of said flat plate in embedding relation to said metal plates, thus producing said flat plate.

12. A method according to claim 11, wherein if said casing is deformed after said resin frames are integrally molded, said metal plates are pressed to correct said casing out of the deformation.

13. A method according to claim 11, wherein each of said metal plates is of an L-shaped cross section.

14. A method according to claim 13, wherein each of said metal plates has a plurality of openings defined in a bottom panel thereof which is mounted on said flat plate.

15. A method according to claim 11, wherein said flat plate has four ends, said resin frames being integrally molded in embedding relation to said metal plates on the three ends except the end which provides an opening for removing the radiation image recording medium.

* * * * *